Figure 1:
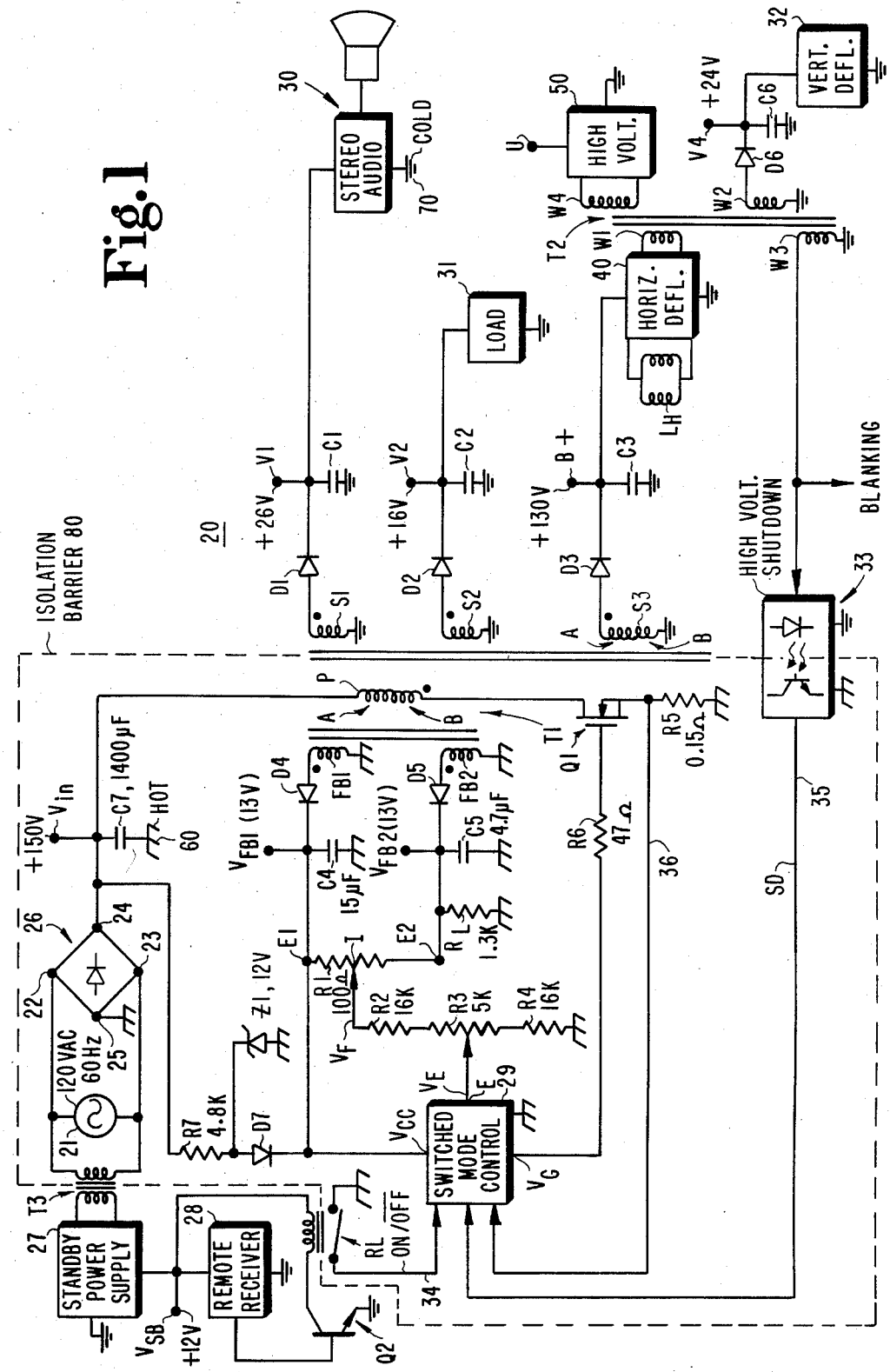

United States Patent [19]

Hoover

[11] Patent Number: 4,692,852
[45] Date of Patent: Sep. 8, 1987

[54] SWITCHING POWER SUPPLY WITH RASTER WIDTH STABILIZATION

[75] Inventor: Alan A. Hoover, New Palestine, Ind.

[73] Assignee: RCA Corporation, Princeton, N.J.

[21] Appl. No.: 878,234

[22] Filed: Jun. 25, 1986

[51] Int. Cl.[4] .......................................... H02M 3/335
[52] U.S. Cl. ....................................... 363/21; 363/97; 363/124; 363/131; 358/190; 315/370; 315/411
[58] Field of Search ........................... 363/18-21, 363/79, 80, 95, 97, 124, 131; 358/190; 315/370, 411

[56] References Cited

U.S. PATENT DOCUMENTS

| 3,641,267 | 2/1972 | Cavallari | 358/190 |
| 4,253,137 | 2/1981 | Rao | 363/21 |
| 4,298,829 | 11/1981 | Luz | 315/411 X |
| 4,335,423 | 6/1982 | Koizumi et al. | 363/21 |
| 4,481,564 | 11/1984 | Balaban | 363/21 |
| 4,510,564 | 4/1985 | Seer, Jr. | 363/23 |
| 4,559,481 | 12/1985 | Dietz | 315/411 |
| 4,572,993 | 2/1986 | Haferl | 315/411 X |

OTHER PUBLICATIONS

RCA Color Television Basic Service Data CTC 133 Series, dated 1985, pp. 1-C1 and 1-C2.
U.S. patent application, Ser. No. 793,421, filed Oct. 31, 1985, entitled Switching Power Supply Regulator For Isolated Chassis, by J. H. Wharton.

Primary Examiner—Peter S. Wong
Assistant Examiner—Emanuel Todd Voeltz
Attorney, Agent, or Firm—Eugene M. Whitacre; Paul J. Rasmussen; Joseph J. Laks

[57] ABSTRACT

In a switching power supply for a video display apparatus, the primary winding of an isolation power transformer is coupled to a chopper switch and to an AC mains rectified output voltage source. A control circuit regulates the conduction of the chopper switch. A B+ voltage for a horizontal deflection circuit is generated from a first secondary winding electrically isolated from the primary winding. An audio supply voltage for a power audio circuit is generated from a second secondary winding also electrically isolated from the primary winding. A first feedback winding, more tightly coupled magnetically to the first secondary winding, and a second feedback winding, more tightly coupled to the second secondary winding, develop respective feedback voltages. The feedback voltages are proportionally summed and applied to the control circuit to vary the conduction of the chopper switch in a manner that regulates the secondary winding voltages and stabilizes raster width with audio loading changes.

35 Claims, 5 Drawing Figures

| SETTING OF WIPER R1 | VOLTAGE MEASURED | VALUE AT NO AUDIO LOAD (VOLTS) | VALUE AT FULL AUDIO LOAD (VOLTS) | RASTER WIDTH CHANGE WHEN LOAD APPLIED |
|---|---|---|---|---|
| NEAR TERM. E1 | B+<br>$V_{FB1}$<br>$V_{FB2}$ | 130.0<br>13.03<br>12.86 | 131.2<br>13.01<br>13.18 | EXPAND 1/2 INCH |
| NEAR TERM. E2 | B+<br>$V_{FB1}$<br>$V_{FB2}$ | 130.0<br>13.03<br>12.83 | 128.2<br>12.67<br>12.80 | CONTRACT 1/2 INCH |
| AT BALANCE POINT I | B+<br>$V_{FB1}$<br>$V_{FB2}$ | 130.0<br>13.01<br>12.82 | 129.98<br>12.84<br>12.96 | NO NOTICEABLE CHANGE |

Fig.3

SWITCHING POWER SUPPLY WITH RASTER WIDTH STABILIZATION

This invention relates to switching power supplies including switching power supplies for a video display apparatus.

In a switching power supply of the flyback converter type, for example, rectified mains supply voltage is applied to the primary winding of a power transformer. A chopper switch driven by a control circuit regulates the secondary winding voltages. The power transformer may serve as an electrical isolation barrier between the mains supply and the electrically isolated load circuits coupled to secondary windings of the transformer. To maintain electrical isolation, voltage feedback to the control circuit is provided via a feedback winding that is electrically isolated from the aforementioned secondary windings.

When the switching power supply energizes a television receiver or video display apparatus, the voltage developed by one of the electrically isolated secondary windings may be rectified to generate a B+ voltage for a horizontal deflection circuit. The voltage developed by another electrically isolated secondary winding may be rectified to provide a DC supply voltage for another load that consumes high power and that varies in loading, such as a power stereo audio circuit.

Because of the inherent leakage inductance that exists between the feedback winding and the secondary windings, the feedback winding voltage may not accurately represent the secondary winding output voltages during heavy load changes produced by, for example, the audio circuit. Poor regulation of the output voltages may result, and when one of the load circuits is the horizontal deflection circuit, noticeable raster width modulation may occur.

As a feature of the invention, a switching power supply is provided with a feedback voltage arrangement that is capable of counteracting the undesirable interactions of high power load variations. An output switch is coupled to a first winding of a power transformer and to a source of energy. A first load circuit is coupled to a second winding of the transformer and takes energy from the source. A first feedback winding of the transformer develops a first feedback voltage representative of loading on the transformer. A second feedback winding of the transformer develops a second feedback voltage that is also representative of loading on the transformer. A control circuit, coupled to the two feedback windings and to the output switch, varies the switching of the output switch in accordance with the first and second feedback voltages to regulate the energy transfer between the source and the first load circuit.

Figure 2:
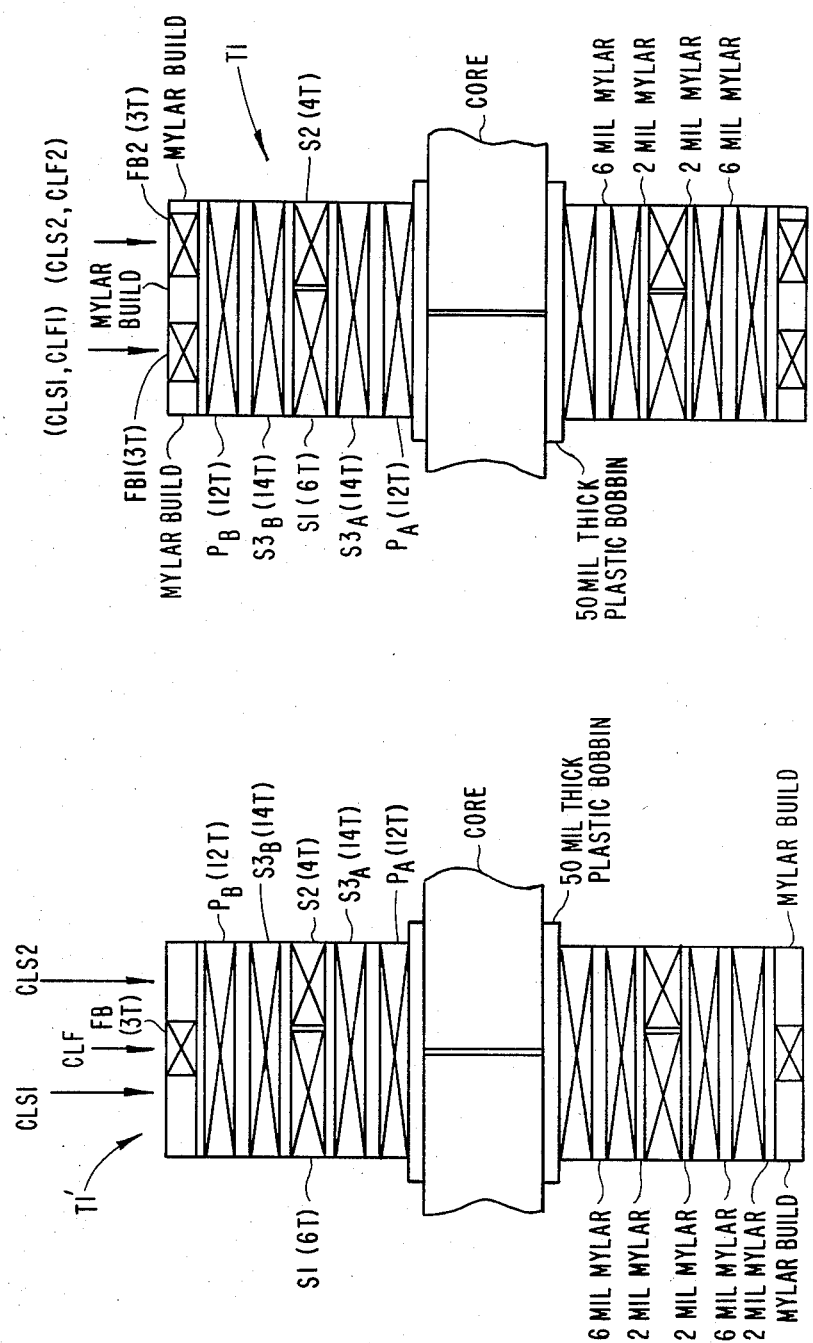
Figure 4:
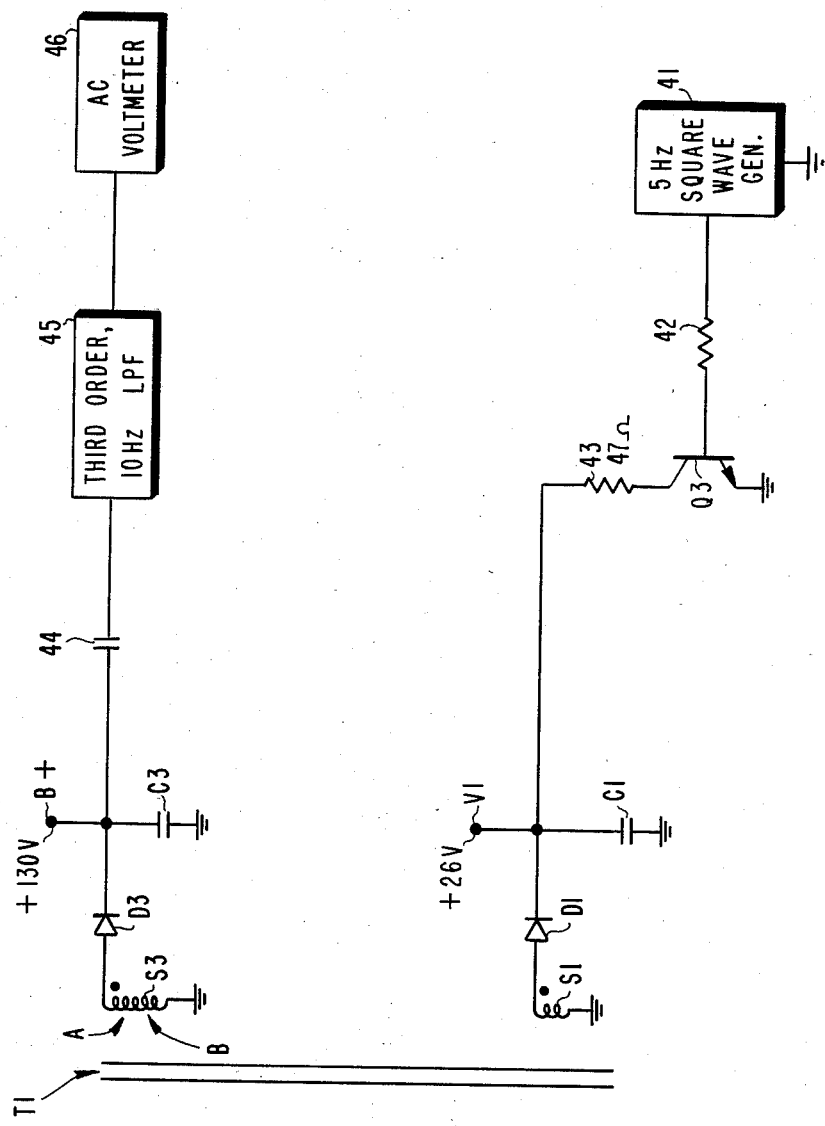

FIG. 1 illustrates a switching power supply for a video display apparatus, embodying the invention;

FIG. 2A schematically illustrates the construction of a power transformer similar to that of FIG. 1 when only a single feedback winding is provided;

FIG. 2B schematically illustrates the construction of the power transformer of FIG. 1 that includes two feedback windings;

FIG. 3 is a table of circuit values and parameters associated with the operation of the switching power supply of FIG. 1; and FIG. 4 illustrates set-up circuitry that is used to properly adjust the potentiometer settings of the power supply of FIG. 1.

A switching power supply 20 of FIG. 1 provides power to various load circuits of a television receiver or video display apparatus. In power supply 20, a source 21 of AC mains supply voltage is coupled between input terminals 22 and 23 of a full-wave bridge rectifier 26 to develop an unregulated DC supply voltage, $V_{in}$, between an output terminal 24 and a current return terminal 25. A filter capacitor C7 is coupled between terminals 24 and 25. Current return terminal 25 serves as a ground terminal 60 that is electrically nonisolated from AC mains supply 21 and is designated in FIG. 1 as a "hot" ground.

Unregulated voltage $V_{in}$ is applied to a primary winding P of a switching power transformer T1. A chopper switch Q1 is coupled to primary winding P and driven by a switching voltage $V_G$ that is developed by a switched mode control circuit 29 and that is applied to the input gate electrode of transistor Q1 via a resistor R6. Overcurrent protection is provided by a sampling resistor R5 that samples the current in primary winding P and in transistor Q1. The voltage developed across sampling R5 is coupled to control circuit 29 via a signal line 36 to disable switching signal $V_G$ under overload operating conditions.

The switching of chopper transistor Q1 produces an AC voltage across primary winding P for developing AC voltages across secondary windings S1 through S3. The relative winding polarities of the primary and secondary windings produce a flyback converter mode of operation. Control circuit 29 may provide either pulse width modulation operation or variable freguency, constant on-time operation, or a combination of both types of operation.

The AC voltage across secondary winding S1 is half-wave rectified by a diode D1 during the flyback interval of each switching cycle and filtered by a capacitor C1 to develop a DC supply voltage V1 that provides power to a high power stereo audio circuit 30. The AC voltage across secondary winding S2 is rectified by a diode D2 during the flyback interval and filtered by a capacitor C2 to develop a DC supply voltage V2 that provides power to other load circuits 31 of the television receiver, such as the luma-chroma processing stages.

The AC voltage across secondary winding S3 is rectified by a diode D3 and filtered by a capacitor C3 to develop a B+ direct voltage for a horizontal deflection circuit 40. Horizontal deflection circuit 40 generates a horizontal deflection current in a horizontal deflection winding $L_H$ having an amplitude that is determined by the amplitude of the B+ voltage. A retrace pulse voltage developed by horizontal deflection circuit 40 is applied to a primary winding W1 of a horizontal flyback transformer T2 for developing retrace pulse voltages in secondary windings W2 through W4.

The voltage across winding W2 is rectified by a diode D6 and filtered by a capacitor C6 to develop a DC supply voltage V4 for a vertical deflection circuit 32. The voltage across winding W4, a high voltage winding, is applied to a high voltage circuit 50 to generate at an ultor terminal U an ultor accelerating potential for the picture tube of the television receiver, not illustrated in FIG. 1.

The retrace pulse voltage developed across winding W3 provides control and synchronization information for such purposes as video blanking and high voltage shutdown. For example, the retrace pulse voltage developed by winding W3 is applied to a high voltage shutdown circuit 33 for developing a shutdown signal SD on a signal line 35 in response to excessive retrace pulse amplitude. Signal SD is applied to switched mode control circuit 29 to stop chopper switch operation under shutdown conditions.

To provide normal on-off control capability in a remote control environment, the output of a remote receiver 28 is coupled to a transistor switch Q2 that controls the coil energization of an on-off relay RL. To switch the television receiver from standby-mode operation to normal, run-mode operation, the relay coil is energized by remote receiver 28 via transistor Q2, permitting the mechanical switch portion of relay RL to make contact with hot-ground 60, thereby grounding a signal line 34. Grounding of signal line 34 enables switched mode control circuit 29 to begin normal operation for generating chopper signal $V_G$.

A standby power supply 27 develops a standby supply voltage $V_{SB}$ for remote receiver 28 and the coil of relay RL. Voltage $V_{SB}$ is derived from the AC mains supply voltage that is coupled to the standby power supply by a step-down mains transformer T3.

To provide electrical shock hazard isolation from AC mains source 21, most of the television receiver circuitry is ground referenced to an electrically isolated ground or current return 70, designated in FIG. 1 as a "cold" ground. Relatively few components and circuits are ground referenced to the nonisolated hot-ground 60. As illustrated in FIG. 1, an isolation barrier 80 is created wherein signal or power communication across the barrier occurs at relatively few points.

An electrical isolation barrier is provided between the primary and secondary winding of standby transformer T3, between the coil and mechanical switch portion of relay RL, and between the input and output sections of high voltage shutdown circuit 33. An isolation barrier for high voltage shutdown circuit 33 may be provided by using, for example, an optocoupler.

Another electrical isolation barrier is provided by power switching transformer T1. Primary winding P and chopper switch Q1 are electrically nonisolated from AC mains source 21, whereas secondary windings S1-S3 are electrically isolated therefrom. Switched mode control circuit 29 is advantageously nonisolated from AC mains source 21, thereby permitting switching voltage $V_G$ to be DC coupled to chopper transistor Q1. This arrangement avoids the need for another point of electrical isolation at the driver of the chopper switch or at the current overload sensing point.

Because switched mode control circuit 29 is hot-ground referenced, whereas the regulated output voltages B+, V1 and V2, are cold-ground referenced, output voltage feedback information must be transferred across isolation barrier 80. To provide an output voltage representative signal on the hot-side of isolation barrier 80, a feedback winding FB1 of power transformer T1 is hot-ground referenced. The voltage across feedback winding FB1 is rectified by a diode D4 during the flyback interval of each switching cycle to develop a direct voltage $V_{FB1}$ that is filtered by a capacitor C4.

Feedback voltage $V_{FB1}$ is applied to an error input terminal E of switched mode control circuit 29 via the wiper of a potentiometer R1 and the wiper of a resistor R3 of voltage dividing resistors R2, R3 and R4 coupled between hot-ground 60 and the wiper of potentiometer R1. Switching voltage $V_G$ is varied by control circuit 29 in accordance with the variations in the secondary winding output voltages as represented in part by variations in feedback voltage $V_{FB1}$.

During normal, run-mode operation of the television receiver, voltage $V_{FB1}$ also serves as the DC supply voltage $V_{CC}$ for switched mode control circuit 29. During standby-mode operation, voltage $V_{CC}$ is supplied from the unregulated input voltage $V_{IN}$ via a dropping resistor R7 and a diode D7. A zener diode Z1 coupled to the junction of resistors R7 and diode D7 stabilizes voltage $V_{CC}$ during standby. Diode D7 becomes reverse biased by voltage $V_{FB1}$ during normal run-mode operation.

In many television receivers, the output supply voltage which requires relatively exacting voltage regulation is the B+ voltage that supplies horizontal deflection circuit 40 of FIG. 1. Even small variations in B+ voltage tend to cause objectionable raster size changes.

When the B+ voltage is not sensed directly, but is sensed by means of an isolated feedback winding, such as winding FB1 of FIG. 1, good regulation of the B+ voltage may be difficult to achieve. A source of the regulation difficulties is the inability of the feedback winding to sense all secondary winding voltages equally accurately. As an example, consider the power supply arrangement of FIG. 1. Power supply 20 produces three secondary supply voltages, a B+ deflection supply, a V1 audio supply to power, e.g., a five watt per channel stereo audio circuit 30, and a V2 supply to power various other television receiver loads, collectively illustrated in FIG. 1 as load 31.

The dynamic load characteristics seen by these three supplies are decidedly different. The B+ deflection supply voltage serves as a supply for horizontal deflection circuit 40, and in addition supplies power to high voltage circuit 50 and vertical deflection circuit 32 via flyback transformer T2. Any significant variation in the B+ supply causes noticeable raster size modulation, both in the width and in the height. The V1 audio supply load has widely varying dynamic characteristics depending on audio program material and volume level setting. The V2 supply has a relatively constant load due to the fact that it supplies mainly low level signal circuits. Appreciable voltage changes in the V2 supply may be tolerated, since linear regulators may be used in series with the loads.

When the volume control of stereo audio circuit 30 is set to its high volume position, modulation of the B+ voltage may occur as a function of audio program material. Consequently, undesirable modulation of the raster size may occur as a function of audio program material.

A contributing factor to audio induced B+ voltage modulation is the presence and distribution of leakage inductance among the secondary windings S1-S3 of power switching transformer T1. FIG. 2A illustrates schematically the construction of a power transformer T1' when only a single feedback winding is provided, the feedback winding being designated as a winding FB. When only a single feedback winding is provided, accurate B+ voltage regulation free of significant audio modulation is difficult to attain. FIG. 2B illustrates, in accordance with an aspect of the invention, the construction of a power transformer that may be used as the transformer T1 of FIG. 1, wherein two feedback windings FB1 and FB2 are provided for purposes to be later described.

Except for the feedback winding arrangement, power transformers T1' and T1 are similarly constructed. All the windings are layer wound on a plastic bobbin which is mounted on the center leg of an E—E configured ferrite core, only partly illustrated in FIGS. 2A and 2B. The cross-sectional area of the center leg is illustratively 0.29 square inches. The winding turns of each layer comprises, illustratively, seven strands of number 30 gauge enameled copper wire, with the height of each layer being 30 mils. The winding traverse of each layer is approximately 0.70 inches.

Primary winding P comprises two layers, $P_A$ and $P_B$ with each layer containing 12 winding turns. The B+ secondary winding S3 also comprises two layers, $S3_A$ and $S3_B$, with each layer containing 14 winding turns. The audio supply secondary winding S1 comprises one layer containing six winding turns, while secondary winding S2 comprises one layer containing four winding turns.

Windings S1 and S2 occupy the same layer and are positioned side-by-side, with the center of the winding traverse of secondary winding S1 being located at position CLS1, and with the center of the winding traverse of secondary winding S2 being located at position CLS2. The layer containing windings S1 and S2 is placed between secondary winding layers $S3_A$ and $S3_B$. Layer $S3_A$ is wound over primary winding layer $P_A$, and primary winding layer $P_B$ is wound over secondary winding layer $S3_B$. Thus, the three secondary winding layers are placed in-between the two primary winding layers.

Mylar insulating tape of proper thickness, e.g. 6 mils, to insure electrical shock hazard isolation from mains supply 21 of FIG. 1, is placed between each primary winding layer and each adjacent secondary winding layer. Mylar insulating tape of lesser thickness, e.g. 2 mils, is placed between each adjacent secondary winding layer.

As mentioned previously, the B+ supply voltage requires tight regulation, whereas the supply voltage with the greatest load fluctuation is the V1 audio supply voltage. Assume now, for purposes of this discussion, that flyback transformer T1' of FIG. 2A is used as the power isolation transformer of FIG. 1, wherein only one feedback winding, designated as a three-turn winding FB in FIG. 2A, is used to generate the error voltage $V_E$ for switched mode control circuit 29.

As a first alternative design, tight B+ regulation may be achieved in an ideal situation where there exists extremely loose magnetic coupling between B+ supply winding S3 and audio supply winding S1. With loose coupling between B+ supply winding S3 and audio supply winding S1, large load fluctuations imposed on audio winding S1 will have a minimal effect on the voltage produced by winding S3.

As a second alternative design, tight B+ regulation may be achieved in the ideal situation where tight coupling exists between B+ supply winding S3 and feedback winding FB of transformer T1'. Any voltage fluctuations in winding S3 will be accurately sensed by the tightly coupled feedback winding FB.

As a third alternative design, tight B+ regulation may be achieved in the ideal situation where a critical value of magnetic coupling is maintained between feedback winding FB and B+ supply winding S3, and between feedback winding FB and audio supply winding S1. If the magnetic coupling between feedback winding FB and audio supply winding FB is too tight relative to the coupling between winding FB and B+ supply winding S3, switched mode control circuit 29 will be overly responsive to audio load fluctuations. Large dynamic audio loading will tend to over-regulate the B+ voltage, causing the B+ voltage to increase under heavy audio loading conditions. The increased B+ voltage will produce a raster size expansion. If the magnetic coupling between feedback winding FB and audio supply winding S1 is too loose relative to the magnetic coupling between feedback winding FB and B+ supply winding S3, and the coupling between feedback winding FB and B+ supply winding S3 is not perfect, then the opposite effect occurs, producing raster size compression.

By providing a critical value of coupling between feedback winding FB and audio supply winding S1 and between feedback winding FB and B+ supply winding S3, the feedback voltage produced by feedback winding FB is maintained relatively insensitive to audio loading fluctuations, thereby avoiding audio loading induced raster size changes.

Since the overall transformer winding construction is largely determined by economic and manufacturing considerations, the first two alternative designs present, as a practical matter, construction and design difficulties that make them relatively undesirable choices for a power isolation transformer.

Although the third alternative design is a realizable arrangement, that creates a critical value of coupling between feedback winding FB and B+ supply winding S3 and between feedback FB and audio supply winding S1, mass production of such a transformer may be difficult to accomplish. Small deviations in the transverse placement of winding FB on the plastic bobbin may produce a change in B+ voltage regulation of ±1 V or more. Objectionable raster size fluctuations may occur when the B+ voltage fluctuates by amounts greater than ±0.4 V. Also, the separation between each turn of winding FB may be critical for good voltage regulation.

In accordance with features of the invention, a transformer winding arrangement is used wherein two feedback windings FB1 and FB2 of FIG. 2B are provided. The voltages across the two feedback windings, $V_{FB1}$ and $V_{FB2}$, are rectified and filtered, as illustrated in FIG. 1, to produce the feedback voltages $V_{FB1}$ and $V_{FB2}$. Rectification of the voltage provided by feedback winding FB2 is provided by a diode D5 during the flyback interval of chopper switching and filtering is provided by a capacitor C5. Feedback voltages $V_{FB1}$ and $V_{FB2}$ are proportionally summed in potentiometer R1, and the summed feedback voltage $V_F$ developed at the wiper of potentiometer R1 is divided by resistors R2–R4 to develop error voltage $V_E$ at the wiper of potentiometer R3 for controlling operation of switched-mode control circuit 29.

FIG. 2B illustrates the placement of the three-turn feedback windings FB1 and FB2 on the bobbin of transformer T1. In accordance with an aspect of the invention, feedback winding FB1 is placed laterally or traversally on the bobbin at a location that provides a high degree of magnetic coupling to audio secondary winding S1. As illustrated in FIG. 2B, the center, CLF1 of the winding traverse of feedback winding FB1 is located over the center CLS1 of the winding traverse of audio supply winding S1. Additionally, the end turns of feedback winding FB1 are laterally located within the end turns of audio secondary winding S1.

In accordance with another aspect of the invention, the second feedback winding, winding FB2, is located on the bobbin of transformer T1 to provide less coupling to audio supply winding S1 than the coupling of winding FB1 to winding S1. In carrying out this aspect of the invention, the center CLF2 of the winding traverse of feedback winding FB2 is located over the center CLS2 of the winding traverse of the other secondary winding, winding S2. The end turns of feedback winding FB2 are laterally located within the end turns of secondary winding S2.

Placement of feedback windings FB1 and FB2 as described above advantageously allows large tolerance in the transformer construction.

Because of the difference in magnetic coupling between audio supply winding S1 and the two feedback winding FB1 and FB2, the two feedback windings respond differently to audio load changes. Because feedback winding FB1 is more tightly coupled to audio supply winding S1 than is feedback winding S2, heavy audio loading will tend to decrease feedback voltage $V_{FB1}$ more than feedback voltage $V_{FB2}$ that is derived from the more loosely coupled feedback winding FB2. Since the two feedback voltages are proportionally summed in potentiometer R1, the influence of feedback voltage $V_{FB1}$ relative to feedback voltage $V_{FB2}$ is controllable in accordance with the adjustment of the potentiometer.

Moving the wiper of potentiometer R1 in FIG. 1 upwardly, weights the resultant feedback voltage $V_F$ more heavily toward voltage $V_{FB1}$. Moving the wiper of potentiometer R1 downwardly, weights the resultant feedback voltage $V_F$ more heavily toward voltage $V_{FB2}$. Thus, the tendency of the B+ voltage to be modulated by the effects of audio loading on the audio supply winding S1 may be adjusted to zero simply by adjusting potentiometer R1. The influence on the resultant feedback voltage $V_F$ can now be readily proportioned between the two feedback voltage $V_{FB1}$ and $V_{FB2}$. This proportioning relaxes the requirement for exacting winding tolerances on the transformer construction.

The table of FIG. 3 illustrates measured values of the B+ voltage, feedback voltages $V_{FB1}$ and $V_{FB2}$, and of raster width changes for various positions of the wiper of potentiometer R1, under no audio loading and under full audio loading. The measurements were taken when a switched mode power supply similar to switching power supply 20 was used in a color television receiver having a 110 degree, 26 V diagonal, in-line picture tube. A 47 ohm resistor was placed across the V1 audio supply to simulate full audio loading. The resistor was decoupled from the V1 audio supply to simulate no audio loading. The table illustrates the relative influence of feedback windings FB1 and FB2 on B+ voltage regulation as a function of audio loading.

The wiper of potentiometer R1 is in the negative feedback regulation loop of switching power supply 20. Switched mode control circuit 29 varies switching voltage $V_G$ applied to chopper transistor Q1 in such a way as to maintain feedback voltage $V_F$ substantially unchanged.

When the wiper of potentiometer of R1 is moved upwardly to its extreme top position, the resistance between the wiper and terminal E1 is minimum; whereas the resistance between the wiper and terminal E2 is maximum. Feedback voltage $V_F$ is therefore more responsive to audio load induced changes on feedback voltage $V_{FB1}$, derived from the tightly coupled winding FB1, than changes on voltage $V_{FB2}$, derived from loosely coupled feedback winding FB2.

In this situation, switched mode control circuit 29 provides regulation of the secondary winding output voltages in accordance with the sensing of variations of feedback voltage $V_{FB1}$. As illustrated in the table, when the wiper of potentiometer R1 is moved near to terminal E1, feedback voltage $V_{FB1}$ is regulated by switched mode control circuit 29 to be remain relatively unchanged from no audio load to full audio load.

Under these circumstances, however, the B+ voltage becomes over-regulated increasing from a level of 130.0 volts for no audio loading to 131.2 volts for full audio loading. The result is an undesirable expansion in raster width of approximately ½ inch under full audio loading.

The over-regulation of the B+ voltage occurs due to the tighter magnetic coupling between feedback winding FB1 and audio supply winding S1. At full audio loading, the decrease in voltage across feedback winding FB1 during the chopper flyback interval is relatively greater than the decrease in voltage across the B+ supply winding S3. Switched mode control circuit 29, directly responsive to the decrease in voltage across feedback winding FB1, adjusts the switching of chopper transistor Q1 so as to restore the amplitude of the voltage across feedback winding FB1 to its previous level. The effect of the adjustment in chopper switching is to increase the amplitude of the voltage across B+ supply winding S3 above the amplitude required to maintain a constant B+ level, resulting in an increased B+ voltage at full audio loading and in a raster width expansion.

An analogous situation holds true when the wiper of potentiometer R1 is adjusted downwardly to its extreme bottom position that provides minimum resistance between the wiper and terminal E2 and maximum resistance between the wiper and terminal E1. Feedback voltage $V_F$ is influenced more by feedback voltage $V_{FB2}$ than by feedback voltage $V_{FB1}$.

As illustrated in the table of FIG. 3, when the wiper of potentiometer R1 is moved near to terminal E2, switched mode control circuit 29 responds to audio load changes by maintaining the voltage $V_{FB2}$ relatively constant from no audio loading to full audio loading. The result is an under-regulation of the B+ voltage, with the B+ voltage decreasing at full audio loading from its no audio load level. This produces an undesirable raster width contraction of approximately ½ inch.

Because feedback winding FB2 is more loosely coupled to audio supply winding S1, a decrease in the amplitude of the voltage developed across B+ supply winding S3 due to increased audio loading is not reflected as an adequate decrease in the amplitude of the voltage across feedback winding FB2. Switched mode control circuit 29 therefore does not fully restore the B+ voltage to the level required to maintain a constant B+ voltage at the increased audio load levels.

In accordance with an aspect of the invention, the relative contributions by feedback windings FB1 and FB2 to the development of feedback voltage $V_F$ may be adjusted to produce relatively little B+ voltage change between no audio loading and full audio loading conditions. By adjusting the wiper of potentiometer R1 to an intermediate position at an intermediate terminal I of the potentiometer, feedback voltages $V_{FB1}$ and $V_{FB2}$ are proportionally summed at the wiper, such that the overcompensating effect during increased audio loading of feedback winding FB1 is balanced out by the undercompensating effect of feedback winding FB2.

As illustrated in the table of FIG. 3, with the wiper of potentiometer R1 located at intermediate terminal I, the B+ voltage remains relatively unchanged between no audio loading and full audio loading to produce no noticeable change in raster width between the two loading conditions.

The balancing effects of the two feedback winding voltages may also be noted from the values given in the last row of the table in FIG. 3. Due to the proportional summing of the two feedback winding voltages, switched mode regulator control circuit 29, in maintaining the resultant feedback voltage $V_F$ relatively constant, under-responds to increased audio loading induced changes in feedback voltage $V_{FB1}$ and over-responds to increased audio loading induced changes in feedback voltage $V_{FB2}$. The net effect is a balancing of the responses of the two feedback winding voltages in a manner that maintains the B+ voltage and raster width relatively unchanged.

The adjustment procedure of the wiper of potentiometer R1 for locating balance point terminal I of FIG. 1 is as follows. First, measure the B+ voltage at no audio load. Adjust the wiper of voltage divider resistor R3 to provide an error voltage $V_E$ that gives the specified B+ voltage level. Next, load down audio supply winding S1 to its full audio loading level by, e.g., placing an equivalent resistance across the V1 voltage supply. Then, remeasure the B+ voltage and adjust the wiper of potentiometer R1 to a position that restores the B+ voltage to its specified level. The location of the wiper of potentiometer R1 after such adjustment is the intermediate balance point terminal I.

Voltages $V_{FB1}$ and $V_{FB2}$ will usually be unequal at the no audio loading level due to construction tolerances of transformer T1 and differences in the forward voltage drops between diodes D4 and D5. As a result, adjustment of the wiper of potentiometer R1 will affect the initial setting of the wiper of potentiometer R3. Therefore, several iterations of the adjustment procedure are usually required before both potentiometer settings are correct.

In accordance with an advantageous feature, a load resistor $R_L$ is placed across filter capacitor C5 of FIG. 1 to load feedback winding FB2 by substantially the same amount that feedback winding FB1 is loaded. The equalization or matching of loading on the two feedback windings is desirable because the rectified DC voltages $V_{FB1}$ and $V_{FB2}$ are then more nearly equal, resulting in less B+ change as R1 is adjusted.

FIG. 4 illustrates circuitry that may be advantageously used in carrying out the procedure for B+ voltage adjustment described previously. In FIG. 4, a load resistor 43, equivalent to the load resistance of audio circuit 30 of FIG. 1 at full audio loading, is switched across the V1 supply by a transistor Q3. The switching rate of transistor Q3 is controlled by a 5 hertz square-wave generator 41 coupled to the base of transistor Q3 via a resistor 42. To measure any load induced modulation of the B+ voltage by switched load resistor 43, the B+ voltage is AC coupled via a capacitor 44, filtered by a third order, 10 hertz low-pass filter 45, and applied to an AC voltmeter 46.

The B+ voltage adjustment procedure of the impedance network that includes potentiometer R1 and R3, using the circuitry of FIG. 4, is as follows. Adjust potentiometer R3 to obtain specified B+ voltage level at no load with generator 41 disabled. Energize generator 41 to alternately couple and decoupled load resistor 43 to the V1 audio supply at the 5 hertz rate of square-wave generator 41. The switching of load resistor 43 produces a 5 hertz change in the loading of transformer T1 between no load on audio supply winding S1 and full load.

Assuming the wiper of potentiometer R1 is not located at balance point terminal I of FIG. 1, the switching of load resistor 43 results in a 5 hertz modulation of the B+ supply voltage level. The amplitude of the B+ modulation is measured by AC voltmeter 46. The wiper of potentiometer R1 is then adjusted to produce an approximately zero-volt reading by voltmeter 46. When the zero-volt reading occurs, the wiper has been properly set at balance point terminal I, thereby eliminating or producing substantially zero B+ modulation with loading changes on audio supply winding S1.

A rate of 5 hertz was selected for the switching of load resistor 43 because the 5 hertz rate is significantly different than the vertical deflection frequency that also produces ripple on the B+ supply voltage. Lowpass filter 45 prevents the vertical rate ripple of the B+ supply voltage from being measured by AC volt meter 46.

What is claimed:

1. A switching power supply for a video display apparatus, comprising:
   a source of energy;
   a power transformer;
   output switching means coupled to a first winding of said transformer and to said source;
   a deflection circuit of said video display apparatus coupled as a first load circuit to a second winding of said transformer and taking energy from said source for producing a raster;
   a first feedback winding of said transformer for developing a first feedback voltage representative of variations in loading on said transformer;
   a second feedback winding of said transformer for developing a second feedback voltage representative of variations in loading on said transformer; and
   a control circuit coupled to said first and second feedback windings and to said output switching means for controlling the switching thereof in accordance with said first and second feedback voltages to regulate the energy transfer beween said source and said deflection circuit for stabilizing the size of said raster.

2. A power supply according to claim 1 including means for summing said first and second feedback voltages to develop a third feedback voltage that controls the switching of said output switching means.

3. A power supply according to claim 1 wherein said first winding and the two feedback windings are electrically nonisolated from said source and said second winding is electrically isolated therefrom.

4. A power supply according to claim 3 wherein said first and second feedback voltages vary by differing amounts in accordance with said variations in loading.

5. A power supply according to claim 4 including means for summing said first and second feedback voltages to develop a third feedback voltage that controls the switching of said output switching means.

6. A power supply according to claim 1 including a second load circuit coupled to a third winding of said transformer and taking a variable amount of energy from said source, said first and second feedback voltages varying by differing amounts in accordance with the variable amount of energy taken by said second load circuit.

7. A power supply according to claim 6 including means for summing said first and second feedback voltages to develop a third feedback voltage that controls the switching of said output switching means.

8. A power supply according to claim 6 wherein said first winding and the two feedback windings are electrically nonisolated from said source, whereas said second and third windings are electrically isolated therefrom.

9. A power supply according to claim 1 including a second load circuit coupled to a third winding of said transformer and taking energy from said source, wherein said first feedback winding is relatively tightly coupled magnetically with one of said second and third windings and said second feedback winding is relatively loosely coupled magnetically with said one winding.

10. A power supply according to claim 9 wherein said first feedback winding is relatively loosely coupled magnetically with the other one of said second and third windings and said second feedback winding is relatively tightly coupled magnetically with the other one winding.

11. A power supply according to claim 10 wherein all of the mentioned windings are wound over a magnetizable core with turns of the first feedback winding being located generally closer to turns of the second winding than to turns of the third winding, and turns of the second feedback winding being located generally closer to turns of the third winding than to turns of the second winding.

12. A power supply according to claim 11 wherein said first feedback winding and said second winding are substantially centered, one over the other, and said second feedback winding and said third winding are substantially centered, one over the other.

13. A power supply according to claim 9 including means for summing said first and second feedback voltages to develop a third feedback voltage that controls the switching of said output switching means.

14. A power supply according to claim 1 wherein said control circuit operates said switching means in a flyback converter mode.

15. A power supply according to claim 14 wherein said control circuit operates said switching means with a generally constant on-time.

16. A power supply according to claim 1 including a first rectifier and filter coupled to said first feedback winding for developing said first feedback voltage as a direct voltage, and a second rectifier and filter coupled to said second feedback winding for developing said second feedback voltage as a direct voltage.

17. A power supply according to claim 16 including a potentiometer having said first feedback voltage applied to a first terminal thereof and said second feedback voltage applied to a second terminal thereof, with a wiper of said potentiometer coupled to said control circuit and to a terminal intermediate the two mentioned terminals.

18. A power supply according to claim 16 including another load circuit being supplied with voltage by said first feedback voltage and means coupled to said second feedback winding for matching the loading occurring on the two feedback windings.

19. A power supply according to claim 18 wherein said matching means comprises a resistor having said second feedback voltage applied thereacross.

20. A switching power supply, comprising:
a source of energy;
a power transformer;
output switching means coupled to a first winding of said transformer and to said source;
a first load circuit electrically isolated from said source and coupled to a second winding of said transformer also electrically isolated from said source and taking energy from said source;
a first feedback winding of said transformer not electrically isolated from said source for developing a first feedback voltage representative of loading on said transformer;
a second feedback winding of said transformer not electrically isolated from said source for developing a second feedback voltage representative of loading on said transformer; and
a control circuit coupled to said output switching means and having an electrically nonisolated section coupled to said first and second feedback windings for controlling the switching of said output switching means in accordance with said first and second feedback voltages to regulate the energy transfer between said source and said first load circuit,
wherein said first load circuit comprises a line deflection circuit and including a second load circuit coupled to a third winding of said transformer and taking a variable amount of energy from said source, said control circuit being responsive to said first and second feedback voltages to regulate the amount of energy transfer between said source and said line deflection circuit in a manner that maintains a relatively constant raster width as the amount of energy taken by said second load circuit varies.

21. A switching power supply, comprising:
a source of energy;
a power transformer;
output switching means coupled to a first winding of said transformer and to said source;
a first load circuit electrically isolated from said source and coupled to a second winding of said transformer also electrically isolated from said source and taking energy from said source;
a first feedback winding of said transformer not electrically isolated from said source for developing a first feedback voltage representative of loading on said transformer;
a second feedback winding of said transformer not electrically isolated from said source for developing a second feedback voltage representative of loading on said transformer;
a control circuit coupled to said output switching means and having an electrically nonisolated section coupled to said first and second feedback windings for controlling the switching of said output switching means in accordance with said first and second feedback voltages to regulate the energy transfer between said source and said first load circuit; and
a second load circuit coupled to a third winding of said transformer and taking energy from said source, wherein said first feedback winding is relatively tightly coupled magnetically with one of said second and third windings and said second feedback winding is relatively loosely coupled magnetically with said one winding.

22. A power supply according to claim 21 including means for summing said first and second feedback voltages to develop a third feedback voltage that controls the switching of said output switching means.

23. A power supply according to claim 21 wherein said first and second feedback voltages vary by differing amounts in accordance with the variable amount of energy taken by said second load circuit.

24. A power supply according to claim 21 wherein all of the mentioned windings are wound over a magnetizable core with turns of the first feedback winding being located generally closer to turns of the second winding than to turns of the third winding, and turns of the second feedback winding being located generally closer to turns of the third winding than to turns of the second winding.

25. A power supply according to claim 24 wherein said first feedback winding and said second winding are substantially centered, one over the other, and said second feedback winding and said third winding are substantially centered, one over the other.

26. A switching power supply, comprising:
a source of energy;
a power transformer;
output switching means coupled to a first winding of said transformer and to said source;
a first load circuit electrically isolated from said source and coupled to a second winding of said transformer also electrically isolated from said source and taking energy from said source;
a first feedback winding of said transformer not electrically isolated from said source for developing a first feedback voltage representative of loading on said transformer;
a second feedback winding of said transformer not electrically isolated from said source for developing a second feedback voltage representative of loading on said transformer;
a potentiometer having said first feedback voltage applied to a first terminal thereof and said second feedback voltage applied to a second terminal thereof; and
a control circuit coupled to said output switching means and having an electrically nonisolated section coupled to said first and second feedback windings via a wiper of said potentiometer that is coupled to a terminal intermediate the two mentioned terminals for controlling the switching of said output switching means in accordance with said first and second feedback voltages to regulate the energy transfer between said source and said first load circuit.

27. A switching power supply, comprising:
a source of energy;
a power transformer;
output switching means coupled to a first winding of said transformer and to said source;
a first load circuit electrically isolated from said source and coupled to a second winding of said transformer also electrically isolated from said source and taking energy from said source;
a first feedback winding of said transformer not electrically isolated from said source for developing a first feedback voltage representative of loading on said transformer;
a second feedback winding of said transformer not electrically isolated from said source for developing a second feedback voltage representative of loading on said transformer;
a control circuit coupled to said output switching means and having an electrically nonisolated section coupled to said first and second feedback windings for controlling the switching of said output switching means in accordance with said first and second feedback voltages to regulate the energy transfer between said source and said first load circuit;
another load circuit being supplied with voltage by said first feedback voltage; and
means coupled to said second feedback winding for matching the loading occurring on the two feedback windings.

28. A power supply according to claim 27 wherein said matching means comprises a resistor having said second feedback voltage applied thereacross.

29. A switching power supply, comprising:
a source of energy;
a power transformer;
output switching means coupled to a first winding of said transformer and to said source;
a first load circuit coupled to a second winding of said transformer and taking energy from said source;
first means for rectifying and filtering a voltage developed by a first feedback winding of said transformer for developing a first feedback DC voltage representative of loading on said transformer;
second means for rectifying and filtering a voltage developed by a second feedback winding of said transformer for developing a second DC feedback voltage representative of loading on said transformer; and
a control circuit responsive to said first and second feedback voltages and coupled to said output switching means for controlling the switching thereof in accordance with said first and second feedback voltages to regulate the energy transfer between said source and said first load circuit, wherein said first load circuit comprises a line deflection circuit and including an audio circuit coupled to a third winding of said transformer, wherein said control circuit is responsive to said first and second feedback voltages to regulate the amount of energy transfer between said source and said line deflection circuit in a manner that maintains a relatively constant raster width as the amount of energy taken by said audio circuit varies.

30. A power supply according to claim 29 including a potentiometer having said first feedback voltage applied to a first terminal thereof and said second feedback voltage applied to a second terminal thereof, with a wiper of said potentiometer coupled to said control circuit and to a terminal intermediate the two mentioned terminals.

31. A power supply according to claim 29 including another load circuit being supplied with voltage by said first feedback voltage and means coupled to said second feedback winding for matching the loading occurring on the two feedback windings.

32. A method of adjusting a B+ voltage developed by a first supply winding of a switching transformer in a switched mode power supply that is loaded by a variable load circuit coupled to a second supply winding of said transformer, wherein a feedback voltage developed by said transformer and adjusted in value by an adjustable impedance network is coupled to a control circuit of said switched mode power supply to control said B+ voltage, said method comprising the steps of:

periodically loading and unloading said second supply winding;

detecting modulation of said B+ voltage produced by said loading and unloading; and adjusting said impedance network in accordance with the detected modulation of said B+ voltage.

33. The method of claim 32 wherein said detecting step includes the step of filtering said B+ voltage to pass a modulation frequency associated with a frequency related to periodic loading and unloading of said second supply winding while filtering out other frequencies.

34. The method of claim 33 wherein said filtering step comprises the step of filtering said B+ voltage to filter out a vertical scanning frequency.

35. The method of claim 32 wherein said adjusting step comprises the step of adjusting said impedance network to produce substantially zero modulation of said B+ voltage.

* * * * *